(12) United States Patent
Karl et al.

(10) Patent No.: US 8,970,806 B2
(45) Date of Patent: Mar. 3, 2015

(54) DISPLAY UNIT

(75) Inventors: Klaus Karl, Geinhausen (DE); Robert Wolfgang Kissel, Egelsbach (DE); Hans-Joachim Lück, Dietzenbach (DE)

(73) Assignee: Continental Automotive GmbH, Hannover (DE)

( * ) Notice: Subject to any disclaimer, the term of this patent is extended or adjusted under 35 U.S.C. 154(b) by 67 days.

(21) Appl. No.: 13/997,147

(22) PCT Filed: Dec. 21, 2011

(86) PCT No.: PCT/EP2011/073649
§ 371 (c)(1),
(2), (4) Date: Jun. 21, 2013

(87) PCT Pub. No.: WO2012/085122
PCT Pub. Date: Jun. 28, 2012

(65) Prior Publication Data
US 2013/0314639 A1    Nov. 28, 2013

(30) Foreign Application Priority Data
Dec. 22, 2010   (DE) .......................... 10 2010 055 482

(51) Int. Cl.
*G02F 1/1333* (2006.01)
*G06F 1/16* (2006.01)

(52) U.S. Cl.
CPC ........ *G02F 1/133308* (2013.01); *G06F 1/1601* (2013.01)
USPC ...................................... 349/58; 361/679.01

(58) Field of Classification Search
CPC ........................................... G02F 2001/133314
USPC ....................................... 349/58; 361/679.01
See application file for complete search history.

(56) References Cited

U.S. PATENT DOCUMENTS

| | | | |
|---|---|---|---|
| 8,027,164 B2* | 9/2011 | Peck | 361/730 |
| 2003/0112380 A1 | 6/2003 | Lee et al. | |

FOREIGN PATENT DOCUMENTS

| | | |
|---|---|---|
| DE | 37 36 637 A1 | 5/1989 |
| DE | 37 09 330 C1 | 3/1998 |
| EP | 1 191 239 A1 | 3/2002 |
| EP | 1 320 259 A2 | 6/2003 |
| JP | 11-119678 A | 4/1999 |

* cited by examiner

*Primary Examiner* — James Dudek
(74) *Attorney, Agent, or Firm* — Cozen O'Connor

(57) ABSTRACT

A display unit having a display module, which has a display having a rear display wall with bosses having support surfaces. A housing covers the of the display has support bosses through which fastening screws are guided and can be screwed into holes of the screw bosses to brace the display module against the housing. A spacer is arranged between each screw and support. The surface of the spacer extends parallel to the rear display wall. The spacer is supported on the support boss. The spacer surface and the supporting surface of the support boss rise helically in opposite directions and are concentric to a through-hole. The threaded shaft of the fastening screw protrudes through a spacer through-opening and is frictionally locked to the inner wall of the spacer through-opening to a certain torque.

10 Claims, 5 Drawing Sheets

DISPLAY UNIT

CROSS-SECTION TO RELATED APPLICATIONS

This is a U.S. national stage of application No. PCT/EP2011/073649, filed on 21 Dec. 2011. Priority is claimed on German Application No. 10 2010 055 482.0 filed 22 Dec. 2010, the content of which is incorporated here by reference.

BACKGROUND OF THE INVENTION

1. Field of the Invention

The invention relates to a display unit having a display module, which has a display having a display rear wall at the rear side of the display, the display rear wall having a plurality of screw domes that protrude in the direction towards the side facing away from the display and which have support faces parallel with plane of the display rear wall, having a housing that covers the rear side of the display module and support domes opposite the screw domes and which have support faces and through-holes directed towards the screw domes and through which there are inserted securing screws supported with the screw heads thereof at the side facing away from the display module and which can be screwed into holes of the screw domes to brace the display module directly or indirectly against the housing.

2. Description of the Prior Art

With such display units, very high demands with respect to the parallelism of the plane of the support faces of the screw domes and the plane of the support faces of the support domes with respect to the plane of the display are intended to be complied with to prevent the formation of spots in the display due to display distortions.

To comply with these high demands, it is necessary to respect the tolerances of a long tolerance chain, whereby the production of the display unit is complex and expensive.

SUMMARY OF THE INVENTION

An object of the invention is to provide a display unit of the type mentioned in the introduction, which prevents distortions of the display with a simple and cost-effective structure.

This object is achieved according to one embodiment of the invention in that, between each screw dome and the support dome associated therewith, there is arranged a spacer piece supported with the side thereof facing the screw dome on the support face of the screw dome, the face of the spacer piece which abuts the support face of the screw dome extending parallel with the plane of the display rear wall, and in that the spacer piece is supported with its spacer piece face facing the support dome on the support face of the support dome, the spacer piece face and the support face of the support dome being constructed concentrically relative to the through-hole so as to extend helically upwards in opposing directions with respect to each other and the securing screw protruding with the threaded shaft thereof through a continuous spacer piece opening, with the inner wall of which the threaded shaft is frictionally engaged up to a specific torque. The spacer pieces between the display module and the housing ensure tolerance compensation between the display module and the housing, the spacer pieces being inserted into the housing when the display unit is assembled, and a specific spacing between the display module and the housing being adjusted using an operating elements.

The variable gap produced between the display module and the housing is filled by the spacer piece. To this end, the securing screws are tightened, the spacer pieces also being rotated due to the frictional engagement between the thread of the securing screws and the inner walls of the spacer openings in the spacer pieces until the helical spacer piece faces move into abutment against the associated helical support faces of the support domes. The variable gaps between the display module and the housing are thereby filled.

Due to the mutual abutment of the helical spacer piece faces and support faces that extend in mutually opposing directions, the torque increases when the securing screws are tightened and exceeds the specific torque and overcomes the frictional engagement between the threaded shafts of the securing screws and the inner walls of the spacer piece openings.

Consequently, the spacer pieces are no longer rotated with the securing screws. They are only screwed into the holes of the screw domes to secure the display module to the housing.

The screw domes can be constructed in a cost-effective manner and the housing requires no processing of the support faces of the support domes.

Narrow tolerances of the abutting components do not have to be complied with.

The spacer piece openings preferably have a polygonal cross-section, such as, for example, a triangular cross-section.

The thread of the securing screw is in abutment only in the central region of the flanks of the polygon so that the frictional engagement between the thread and spacer piece can be limited in a simple manner to the specific torque.

In order to prevent independent rotation of the spacer piece relative to the support dome associated therewith and consequently a release of the bracing action between the display module and the housing, the angle of inclination of the helical rise of the spacer piece face and support face with respect to the plane of the display rear wall may be a self-locking angle.

In one embodiment, the screw domes may be flaps having flap portions that extend parallel with the plane of the display rear wall and which have the holes of the screw domes.

A reduction of the component and assembly complexity is achieved when the display rear wall is a punched bent component, which comprises a metal sheet, with which the flaps are constructed in an integral manner.

If the flaps are further surrounded by sheet metal nuts, whose threaded holes form the holes of the screw domes, an orientation of the display module parallel with the housing can be carried out in a simple manner so that no narrow tolerances have to be complied with in this orientation direction.

A printed circuit board, which extends parallel with the display rear wall, may be arranged between the support faces of the screw domes and the spacer pieces.

For stable retention and to protect the display module, the housing is preferably a rigid cast component, in particular a magnesium cast component, whose support faces of the support domes are unprocessed.

If the display is a liquid crystal display, the prevention of the formation of spots on the display plane of the display due display distortions is particularly effective.

BRIEF DESCRIPTION OF THE DRAWINGS

An embodiment of the invention is illustrated in the drawings and described in greater detail below. In the drawings.

DETAILED DESCRIPTION OF THE PREFERRED EMBODIMENTS

Figure 1:
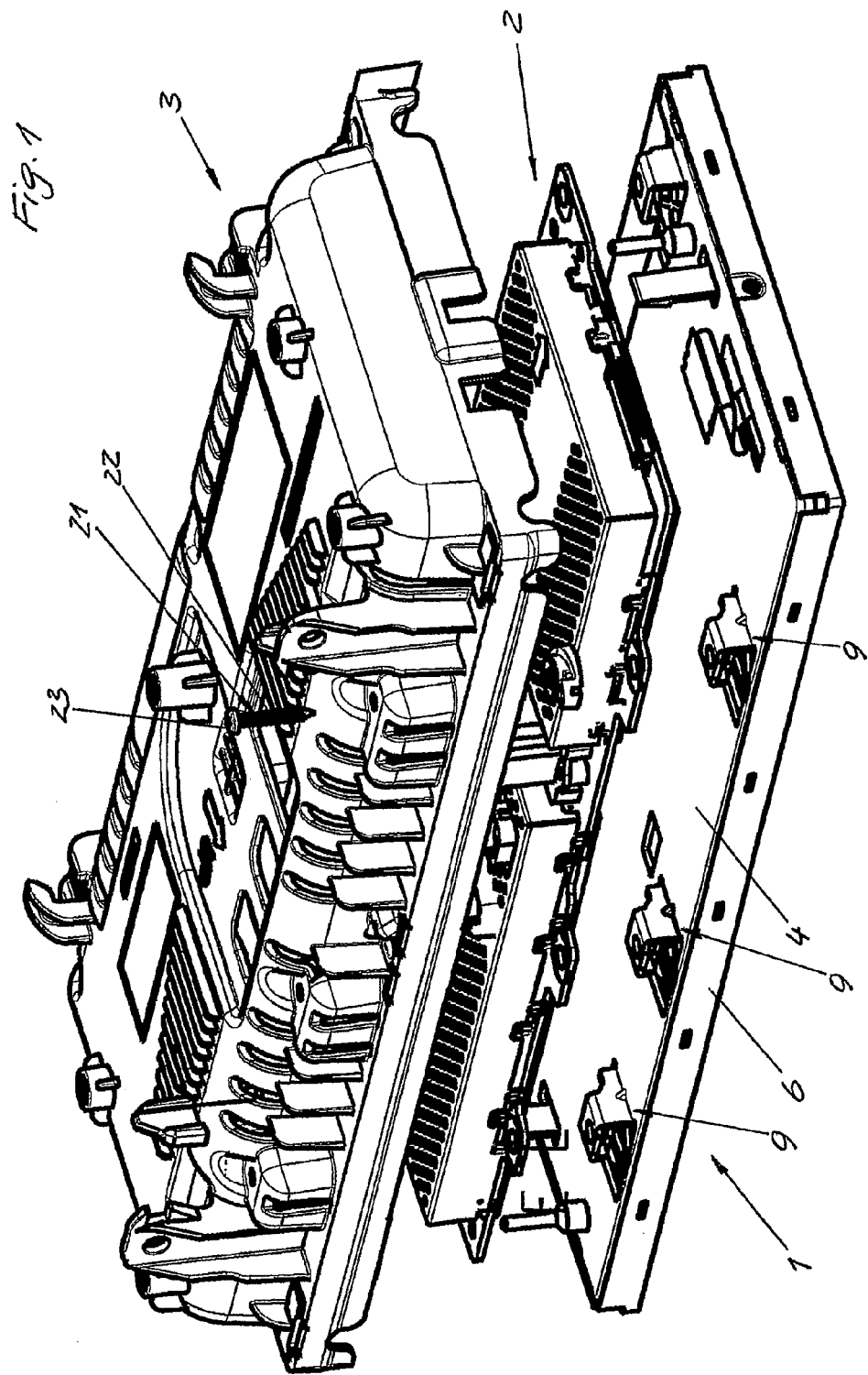
FIG. 1 is an exploded perspective view of a display unit.

FIG. 1 is a perspective view of a display unit from the rear side. It has a display rear wall 1, a printed circuit board 2, and a vessel-like housing 3 as a magnesium cast component.

Figure 2:
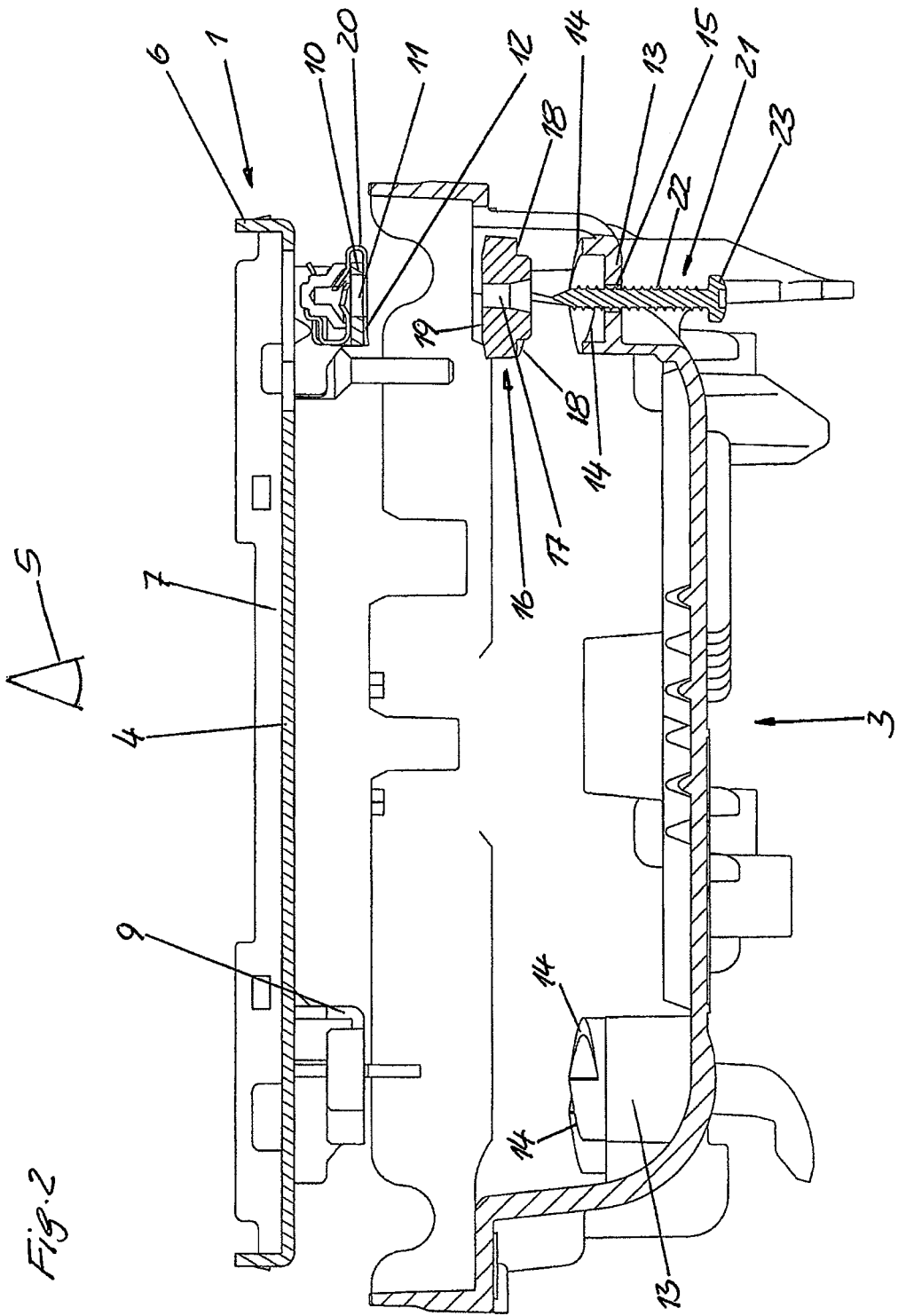
FIG. 2 is an exploded side view of the display unit according to FIG. 1 without any printed circuit board.
Figure 3:
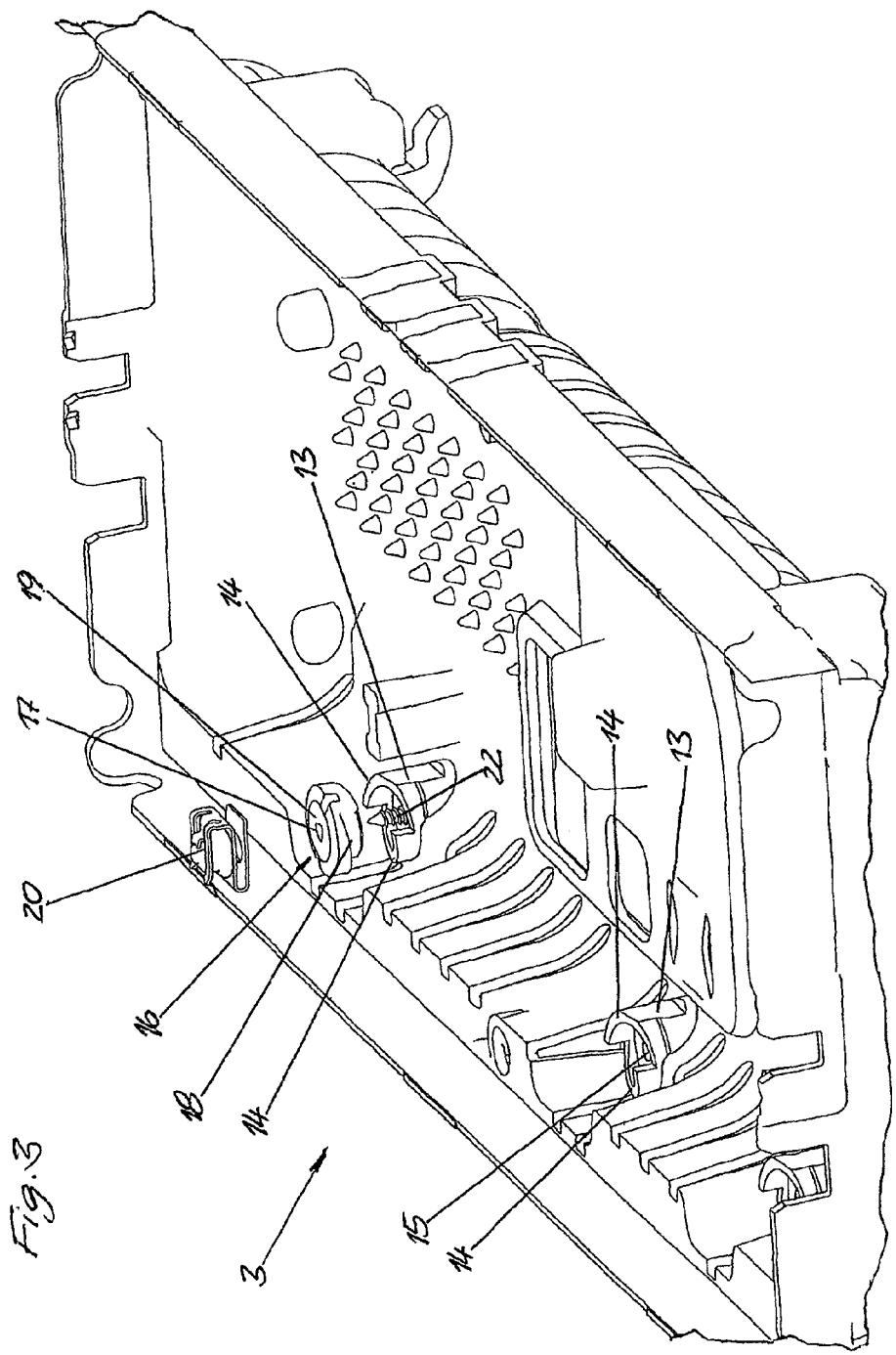
FIG. 3 is a perspective internal view of the housing of the display unit according to FIG. 1 with an exploded view of the securing components.
Figure 4:
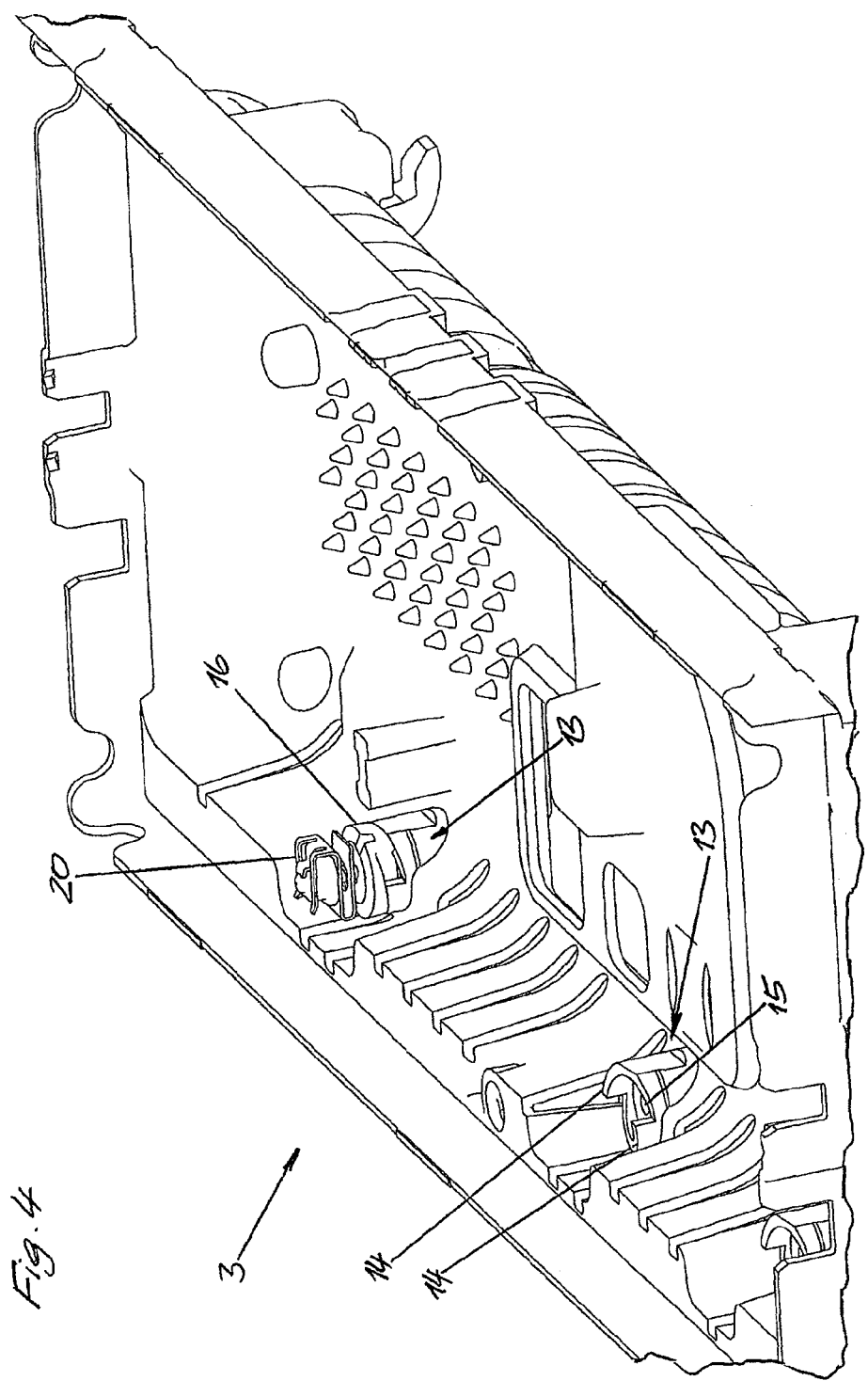
FIG. 4 is a perspective internal view of the housing of the display unit according to FIG. 1.
Figure 5:
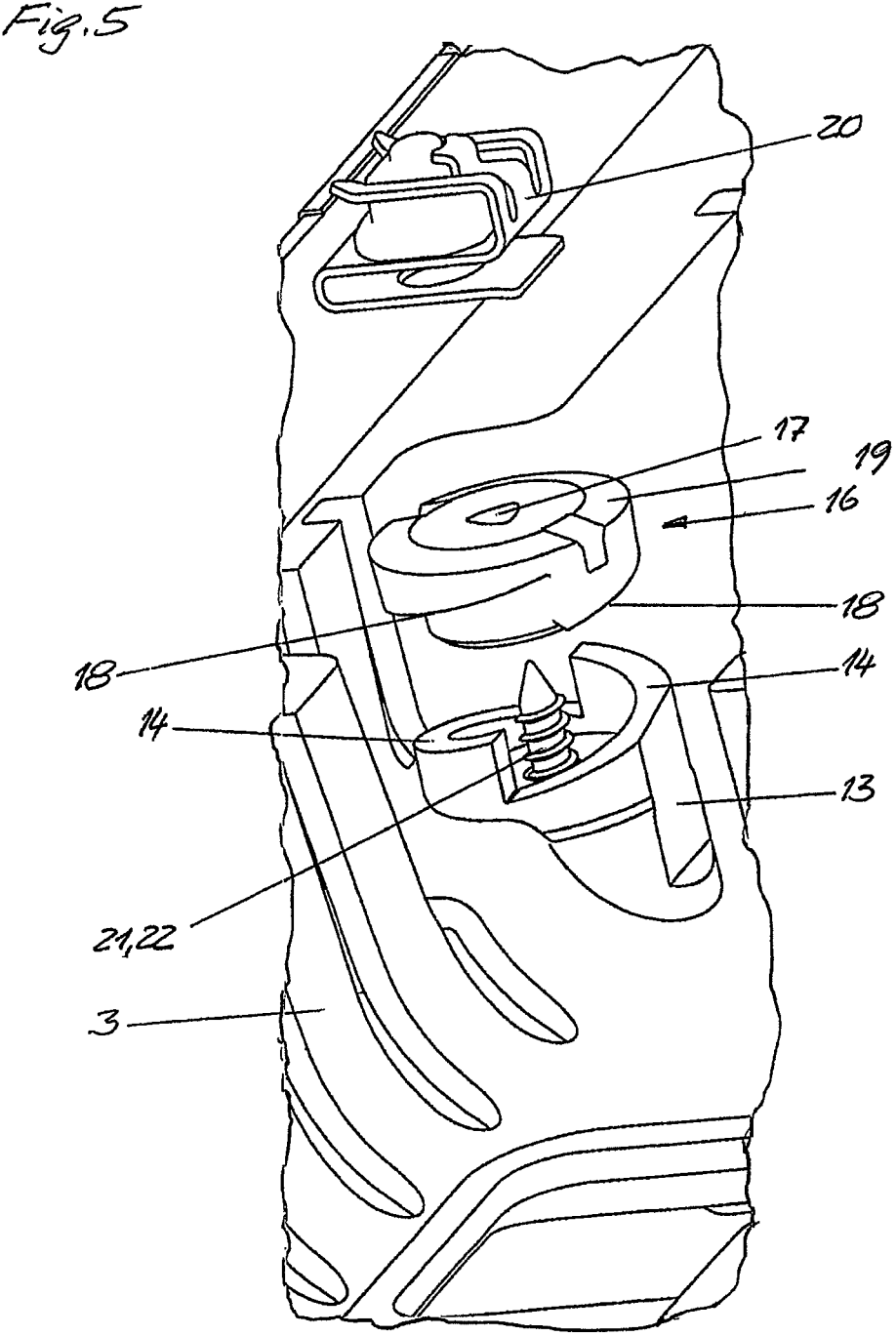
FIG. 5 is an enlarged cutout of FIG. 3.

The display rear wall 1 is a punched bent component comprising a metal sheet and having a base 4 and a peripheral edge 6 that protrudes towards the side of a viewer 5 (FIG. 2).

In the case-like receiving member 7, which is thereby produced, a liquid crystal display, which is not illustrated, can be inserted (FIG. 2).

By punching and bending in the region of the base 4, there are formed along the longitudinal sides of the display rear wall 1 three L-shaped flaps 9, which protrude towards the rear side and have flap portions 10 parallel to the base 4 and which have a through-opening 11.

The sides of the flap portions 10 facing away from the wall 4 form support faces 12 (FIG. 2).

Coaxially relative to the through-openings 11, the housing 3 has support domes 13 having support faces 14 that face the display rear wall 1 and through-holes 15 that extend through the support domes 13 at right-angles relative to the display rear wall 1.

Each support dome 13 has two support faces 14 that form a circle arranged concentrically relative to the through-holes 15, each support face 14 rising in a helical manner in a counter-clockwise direction as it approaches the display rear wall 1.

Spacer pieces 16 having continuous spacer piece openings 17 having a triangular cross-section are arranged coaxially relative to the support domes 13.

At the side facing the support domes 13, the spacer pieces 16 are constructed with two spacer piece faces 18 which are coaxial relative to the spacer piece openings 17 and which form a circle, the spacer piece faces 18 rising in the direction towards the associated support dome 13 and in opposing directions in a helical manner with respect to the support faces 14.

The faces 19 of the spacer pieces 16 facing away from the spacer piece faces 18 extend parallel to the plane of the display rear wall 1.

With these faces 19, the spacer pieces 16 abut the flap portions 10 surrounded by sheet metal nuts 20.

During the assembly, the housing 3 and the display module 1 are orientated with respect to each other and retained by operating elements.

Afterwards, from the rear side of the housing 3, securing screws 21 are inserted through the through-holes 15 with the threaded shaft 22 thereof and screwed into the spacer piece openings 17.

The threaded shaft 22 is first in frictional engagement with the inner wall of the spacer piece opening 17 and thereby rotates the spacer piece 16 until the gap between the printed circuit board 2 and the support face 14 of the support dome 13 is closed.

This is carried out by the spacer piece faces 18 sliding in a ramp-like manner on the support faces 14.

When the securing screws 21 are tightened further, the frictional engagement of the securing screws 21 in the spacer piece opening 17 is overcome and the threaded shaft 22 is screwed further through the spacer piece opening 14 into the sheet metal nut 21 until the screw head 23 of the securing screw 21 is securely supported on the outer side of the housing 3.

Consequently, the display module is connected to the housing 3 in a distortion-free manner.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A display unit comprising:
   a display module
   a display having a display rear wall at a rear side of the display, the display rear wall having a plurality of screw domes that protrude towards the side facing away from the display and which have support faces that are parallel to a plane of the display rear wall;
   a housing that covers the rear side of the display module having support domes arranged opposite the screw domes and support faces and through-holes directed towards the screw domes;
   securing screws supported with respective screw heads and inserted through the through-holes and screwed into holes of the screw domes to brace the display module one of directly and indirectly against the housing;
   a spacer piece arranged between each screw dome and the support dome associated therewith supported with the side thereof facing the screw dome on the support face of the screw dome, a face of the spacer piece which abuts the support face of the screw dome extending parallel with the plane of the display rear wall,
   wherein the spacer piece is supported with its spacer piece face facing the support dome on the support face of the support dome, the spacer piece face and the support face of the support dome being constructed concentrically with respect to the through-hole to extend helically in opposing directions with respect to each other and the securing screw protruding with a threaded shaft thereof through a screw domes angle of inclination continuous spacer piece opening, with an inner wall of which the threaded shaft is frictionally engaged up to a specific torque.

2. The display unit as claimed in claim 1, wherein the spacer piece opening has a polygonal cross-section.

3. The display unit as claimed in claim 1, wherein an screw domes angle of inclination of the helical rise of the spacer piece face and support face with respect to the plane of the display rear wall is a self-locking angle.

4. The display unit as claimed in claim 1, wherein the screw domes are flaps having flap portions that extend parallel to the plane of the display rear wall and which have the holes of the screw domes.

5. The display unit as claimed in claim 4, wherein the display rear wall is a punched bent component that comprises a metal sheet having the flaps constructed in an integral manner.

6. The display unit as claimed in either claim 5, wherein the flaps are surrounded by sheet metal nuts, whose threaded holes form the holes of the screw domes.

7. The display unit as claimed in claim 1, further comprising a printed circuit board that extends parallel to the display rear wall arranged between the support faces of the screw domes and the spacer piece.

8. The display unit as claimed in claim 1, wherein the housing is a rigid cast component whose support faces of the support domes are unprocessed.

9. The display unit as claimed in claim 8, wherein the housing is a magnesium cast component.

10. The display unit as claimed in claim 1, wherein the display is a liquid crystal display.

\* \* \* \* \*